US012798161B2

(12) United States Patent
Grankvist et al.

(10) Patent No.: US 12,798,161 B2
(45) Date of Patent: Nov. 17, 2026

(54) COMPRESSION MOULDING TOOL AND METHOD FOR MANUFACTURING A FIBROUS PULP TRAY USING THE TOOL

(71) Applicant: ROTTNEROS PACKAGING AB, Sunne (SE)

(72) Inventors: Henrik Grankvist, Sunne (SE); Niklas Lundin, Sunne (SE)

(73) Assignee: ROTTNEROS PACKAGING AB, Sunne (SE)

( * ) Notice: Subject to any disclaimer, the term of this patent is extended or adjusted under 35 U.S.C. 154(b) by 198 days.

(21) Appl. No.: 18/564,861

(22) PCT Filed: Apr. 26, 2022

(86) PCT No.: PCT/EP2022/061062
§ 371 (c)(1),
(2) Date: Nov. 28, 2023

(87) PCT Pub. No.: WO2022/253491
PCT Pub. Date: Dec. 8, 2022

(65) Prior Publication Data

US 2024/0181683 A1 Jun. 6, 2024

(30) Foreign Application Priority Data

May 31, 2021 (EP) .................................... 21176837

(51) Int. Cl.
*B29C 43/02* (2006.01)
*B29C 43/14* (2006.01)
(Continued)

(52) U.S. Cl.
CPC ............ *B29C 43/021* (2013.01); *B29C 43/14* (2013.01); *B65D 1/34* (2013.01); *B65D 21/0212* (2013.01);
(Continued)

(58) Field of Classification Search
None
See application file for complete search history.

(56) References Cited

U.S. PATENT DOCUMENTS 3,220,631 A * 11/1965 Reifers .................. A47G 23/06 D9/425
5,403,633 A 4/1995 Jenisch
(Continued)

FOREIGN PATENT DOCUMENTS

EP 0562590 A1 9/1993
GB 691529 A 5/1953
(Continued)

OTHER PUBLICATIONS

Extended European Search Report dated Oct. 27, 2021 for EP Application No. 21176837.9, 10 pages.
(Continued)

*Primary Examiner* — Virak Nguon
(74) *Attorney, Agent, or Firm* — RMCK Law Group, PLC

(57) ABSTRACT

A compression moulding tool for manufacturing a fibrous pulp tray having a floor portion and walls extending from the floor portion. The tool comprises a first female mould element comprising a plurality of first recessed portions, a water permeable filter arranged in the first female mould element and configured to follow the surface of the female mould element, a second female mould element comprising a plurality of second recessed portions at locations corresponding to the first recessed portions and smaller than the first recessed portions, and a male mould element configured to press against the first and second female mould elements to compress a fibrous pulp product located therebetween, the male mould element having a surface profile free from macroscopic features at locations corresponding to the first
(Continued)

and second recessed portions of the first and second female mould.

9 Claims, 6 Drawing Sheets

(51) Int. Cl.
*B29L 31/00* (2006.01)
*B65D 1/34* (2006.01)
*B65D 21/02* (2006.01)

(52) U.S. Cl.
CPC .. *B29C 2043/026* (2013.01); *B29C 2043/144* (2013.01); *B29L 2031/7162* (2013.01)

(56) References Cited

U.S. PATENT DOCUMENTS

| | | | | |
|---|---|---|---|---|
| 2002/0012759 | A1 | 1/2002 | Asayama et al. | |
| 2003/0111201 | A1 | 6/2003 | Sato et al. | |
| 2004/0241274 | A1 | 12/2004 | Odajima et al. | |
| 2005/0109653 | A1 * | 5/2005 | Wnek | B65D 1/34 206/515 |
| 2009/0142523 | A1 * | 6/2009 | Nilsson | D21J 3/00 428/36.1 |
| 2011/0227250 | A1 * | 9/2011 | Wnek | B65D 5/4279 425/542 |
| 2018/0339826 | A1 | 11/2018 | Chung et al. | |

FOREIGN PATENT DOCUMENTS

| | | | |
|---|---|---|---|
| JP | 2006321510 | A2 | 11/2006 |
| WO | 9304939 | A1 | 3/1993 |
| WO | 2008143510 | A1 | 11/2008 |
| WO | 2009013489 | A1 | 1/2009 |
| WO | 2009136783 | A1 | 11/2009 |

OTHER PUBLICATIONS

PCT International Search Report and Written Opinion dated Aug. 19, 2022 for International Application No. PCT/EP2022/061062, 16 pages.

* cited by examiner

COMPRESSION MOULDING TOOL AND METHOD FOR MANUFACTURING A FIBROUS PULP TRAY USING THE TOOL

CROSS-REFERENCE TO RELATED APPLICATIONS

This application is a 371 U.S. National Stage of International Application No. PCT/EP2022/061062, filed Apr. 26, 2022, which claims priority to European Patent Application No. 21176837.9, filed May 31, 2021. The disclosures of each of the above applications are incorporated herein by reference in their entirety.

FIELD OF THE INVENTION

The present invention relates to a moulding tool, a method for forming a fibrous pulp tray, and to a fibrous pulp tray formed by the tool and the method.

BACKGROUND OF THE INVENTION

In the food packaging industry, there is an increasing effort to remove single use plastic packaging containers from the market and to instead substitute with recyclable and renewable material containers.

Commonly used plastic containers have several drawbacks. In addition to the high environmental impact caused by persistent plastic material, most containers cannot be heated in conventional ovens. Moreover, it is not uncommon that many types of plastic packaging's get misplaced, affecting the nearby living nature.

An attractive alternative for replacing plastic and aluminum food containers is fibrous pulp trays, for example formed by compression moulding. Containers made from moulded pulp or moulded fiber can be configured to be used both for cold food and for food to be heated in a microwave oven or in a regular oven. Moreover, moulded pulp containers can be made from renewable and recycled material and they can in turn be recycled after use, making them a sustainable alternative.

In view of the abovementioned advantages of fibrous pulp containers, it is desirable to further improve the attractiveness of such containers to facilitate the transition from plastic and aluminum to paper-based containers.

SUMMARY

In view of above-mentioned and other drawbacks of the prior art, it is an object of the present invention to improve the functionality of fibrous pulp containers by means of the described compression moulding tool and the method for manufacturing a fibrous pulp container.

According to a first aspect of the invention, it is provided a compression moulding tool for manufacturing a fibrous pulp tray having a floor portion and walls extending from the floor portion. The tool comprises: a first female mould element having a floor and sidewalls, the first female mould element comprising a plurality of first recessed portions, each first recessed portion having a first volume; a water permeable filter arranged in the first female mould element and configured to follow the surface of the female mould element, the filter being configured to retain pulp fibers; a second female mould element having a floor and sidewalls corresponding to the first female mould element, the second female mould element comprising a plurality of second recessed portions at locations corresponding to the first recessed portions of the first female mould element, each second recessed portion having a second volume smaller than the first volume, wherein the second recessed portions are configured to form corresponding protrusions at an outer surface of the fibrous pulp tray; and at least one male mould element configured to press against the first and second female mould element to compress a fibrous pulp product located therebetween, the male mould element having a surface profile at locations corresponding to the first and second recessed portions of the first and second female mould which is free from macroscopic features.

The described fibrous pulp tray should in the present context be understood as a container having a floor portion and a number of sidewalls so that it can contain a product. Trays for food packaging typically comprises four sidewalls providing a rectangular container, but other shapes are not excluded from being manufactured using the described tool. A tray may also be referred to as a container, box, carton, package, and the like.

In the present context, the first recessed portions of the first and second female mould elements are area portions at the inner surface of the mould elements where the surface is recessed compared to the surrounding surface. The recessed portion can in various implementations be described as a recess, trench, groove, depression or the like. The purpose of the recessed portion is to gather fibrous pulp so that the resulting tray product has a solid protrusion having a shape corresponding the shape of the second recessed portion located in the second female mould element.

The present invention is based on the realization that a tray having outside protrusions and at the same time a smooth inner surface can be manufactured by the described tool where female mould elements comprising recessed portions of decreasing size are used in successive compression steps. The protrusions are advantageously configured to facilitate stacking and de-stacking of the trays so that the protrusions act to separate two stacked trays from each other, there by simplifying the removal of a tray from a stack of trays. The smooth inner surface of the tray is a result of the male mould element which is free from macroscopic features in combination with the described first and second female mould elements.

That the inner surface of the tray is smooth also means that the profile of the inner surface of a tray formed by the described tool is substantially uniform and unaffected by the protrusions located on the outer surface of the tray. The surface properties and surface profile of the inner surface of the tray at the location of the protrusion is thereby the same as for adjacent portions of the surface. In other words, the inner surface at the location of the outside protrusion is undistinguishable from other portions of the inner surface, at least from a visual inspection.

Moreover, that the male mould element and consequently the resulting tray is free from macroscopic features means that there are no visible or intentional features of the male mould element which would result in corresponding visual features on the inside of the tray at the location corresponding to the protrusion. Features arising from the inherent surface roughness of the male mould element or from wear and tear are considered to be microscopic features.

In existing mold tools, it is known to form protrusions in a moulded tray by having recesses in a female mould and corresponding protrusions in the male mould. However, this leaves an impression on the inside of the tray which may be undesirable in certain implementations. In comparison, the described tool produces a tray with a smooth inner surface which may be both visually appealing and which brings other advantageous effects which will be described in the following.

In the compression moulding tool, fibrous pulp is gathered in the first recessed portion of the first female mould element during the first pressing step. However, when the surface of the male mould element is smooth at the location of the recessed portion, the density of the product in the first recessed portion may not be sufficient to form a solid and robust protrusion. Therefore, a second female mould element is used where the size of the recessed portion is smaller compared to in the first female mould element which will result in the protrusion being compressed to form a solid protrusion with a required density, still without leaving any corresponding marks on the inside of the tray.

An additional advantageous effect of a tray formed by the described tool is that lamination is simplified and improved. In trays for food storage it is often desirable or required to use a plastic film which is laminated to the inside of the tray to protect the paper-based material from moist and water, and also for forming a gas-proof seal between the inside of the tray and outside air. However, in a tray having depressions or protrusions on the inside, the risk of damage to the laminated film is increased, for example in the form of pinholes or other damage which may lead to leakage of air and/or water. Accordingly, by facilitating the manufacturing of a tray having external protrusions and a smooth inner surface, the usability of the tray for example in terms of stacking can be maintained or improved while also improving the properties of the laminated film.

It should however be noted that it still is possible to use a male mould element comprising impressions, patterns, protrusions or the like in locations not corresponding to the recessed portions of the female mould elements if desirable. Such profiles on the inner surface of the tray can then be made sufficiently small so as to not negatively impact lamination. However, protrusions used for stacking often require a certain size, thereby making it difficult to form a tray comprising depressions on the inside of the tray without negatively influencing lamination properties.

According to one embodiment of the invention, the water permeable filter is a wire mesh comprising a plurality of recessed portions formed to fit the plurality of first recessed portions of the first female mould element. For example, a metallic wire mesh is a durable alterative for retaining the pulp fibers while draining away the water. Moreover, the recessed portions of the wire mesh are advantageously formed before the mesh is arranged in and attached to the first female mould element. Thereby, it can be ensured that the recessed portions of the wire mesh do not negatively influence the durability and strength of the wire mesh. Moreover, the wire mesh can be a single layer wire mesh, a double layer wire mesh or any other type of multi-layer mesh. Furthermore, the water permeable filter may be a wire cloth, a screen, porous aluminum, or any other suitable water permeable filtering means known to the skilled person.

According to one embodiment of the invention, the first recessed portions of the first female mould element advantageously have a curved profile. A curved profile of the recessed portion makes it easier to ensure that the entire recess is filled by the fibrous pulp and it also simplifies the integration of the wire mesh in the recess, since sharp corners may increase the risk of the wire mesh being damaged during compression of the product.

According to one embodiment of the invention, the female mould element comprises a plurality of drainage channels arranged such that each of the plurality of first recessed portions comprises at least one drainage channel. The drainage channels are configured to drain water from the pulp in a first pressing step, and the drainage channels are preferably connected to a pump forming a vacuum to draw water from the pulp. By arranging a drainage channel in each of the first recessed portions, the recessed portion will more easily be filled by pulp fibers, thereby ensuring that the resulting protrusion is solid and also that all protrusions of a tray have the same properties.

According to one embodiment of the invention, the first and second recessed portions are located at an upper portion of corners formed by sidewalls of the first and second female mould element. With the described protrusions located at least at the four upper corners of the tray, stacking and de-stacking is made easy and the stacks are evenly formed, facilitating stacking of a large number of trays. Depending on the shape of the tray, it may be desirable to add protrusions also at other locations, such as along the sides of the tray. However, the described tool can be configured to form protrusions anywhere at the outside of a tray, i.e. to provide protrusions formed as feet, ribs or having any other desired shape.

According to a second aspect of the invention, there is provided a method for manufacturing a fibrous pulp tray. The method comprising: depositing a fibrous pulp suspension in a first female mould element having a floor and sidewalls, the female mould comprising a plurality of first recessed portions, each first recessed portion having a first volume, and a water permeable filter configured to retain pulp fibers arranged in in the first female mould element and configured to follow the surface of the first female mould element; pressing a male mould element against the first female mould element to dewater the fibrous pulp suspension such that a fibrous pulp product is formed therebetween and such that fibrous pulp fills the plurality of first recessions, the male mould element having a surface profile free from macroscopic features at locations corresponding to the first recessed portions of the female mould; moving the fibrous pulp product from the first female mould element to a second female mould element, the second female mould element having a floor and sidewalls corresponding to the first female mould element, the second female mould comprising a plurality of second recessed portions at locations corresponding to the first recessed portions of the first female mould element, each second recessed portion having a second volume smaller than the first volume; pressing the male mould element against the second female mould element such that a fibrous pulp product is formed therebetween and such that fibrous pulp fills the plurality of second recessions, thereby forming a fibrous pulp product having a floor, sidewalls and protrusions corresponding to the second recessed portions of the second female mould element.

According to one embodiment of the invention, depositing the fibrous pulp suspension comprises dipping the first female mould element in a container comprising a fibrous pulp suspension. However, other methods of depositing a fibrous pulp are equally possible such as spraying, dipping an upside-down mould in a fibrous pulp suspension, deposition from above etc.

Furthermore, the method advantageously comprises laminating an inside of the fibrous pulp product with a plastic film. As described above, the lamination process is improved by means of the smooth inner surface of the tray.

Further effects and features of the second aspect of the invention are largely analogous to those described above in connection with the first aspect of the invention.

According to a third aspect of the invention, there is provided a fibrous pulp tray obtainable by the method according to the above described method using the described tool. The fibrous pulp tray comprises a floor portion, walls extending from the floor portion; wherein the outside of the tray comprises a plurality of protrusions, the protrusions being an integral part of the tray, and wherein the inside of the tray at the locations of the protrusions has a smooth surface profile.

The fibrous pulp tray may further comprise a flange extending horizontally from an upper portion of the side-walls. The plurality of protrusions are then preferably located on a sidewall adjacent to the flange. The flange can be used to attach a lid or cover to the tray, for example in the form of a plastic film which is peelable from the flange of the tray.

Moreover, the sidewalls of the fibrous pulp tray are preferably sloped outwards to facilitate stacking of the trays. Thereby, a fibrous pulp tray can be provided where the sidewalls and protrusions are configured such that the trays are stackable and such that a distance between two stacked trays is defined by the plurality of protrusions.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various aspects and embodiments of the present invention are mainly described with reference to a manufacturing assembly comprising a compression moulding tool for manufacturing a fibrous pulp tray suitable for food packaging.

Figure 1:
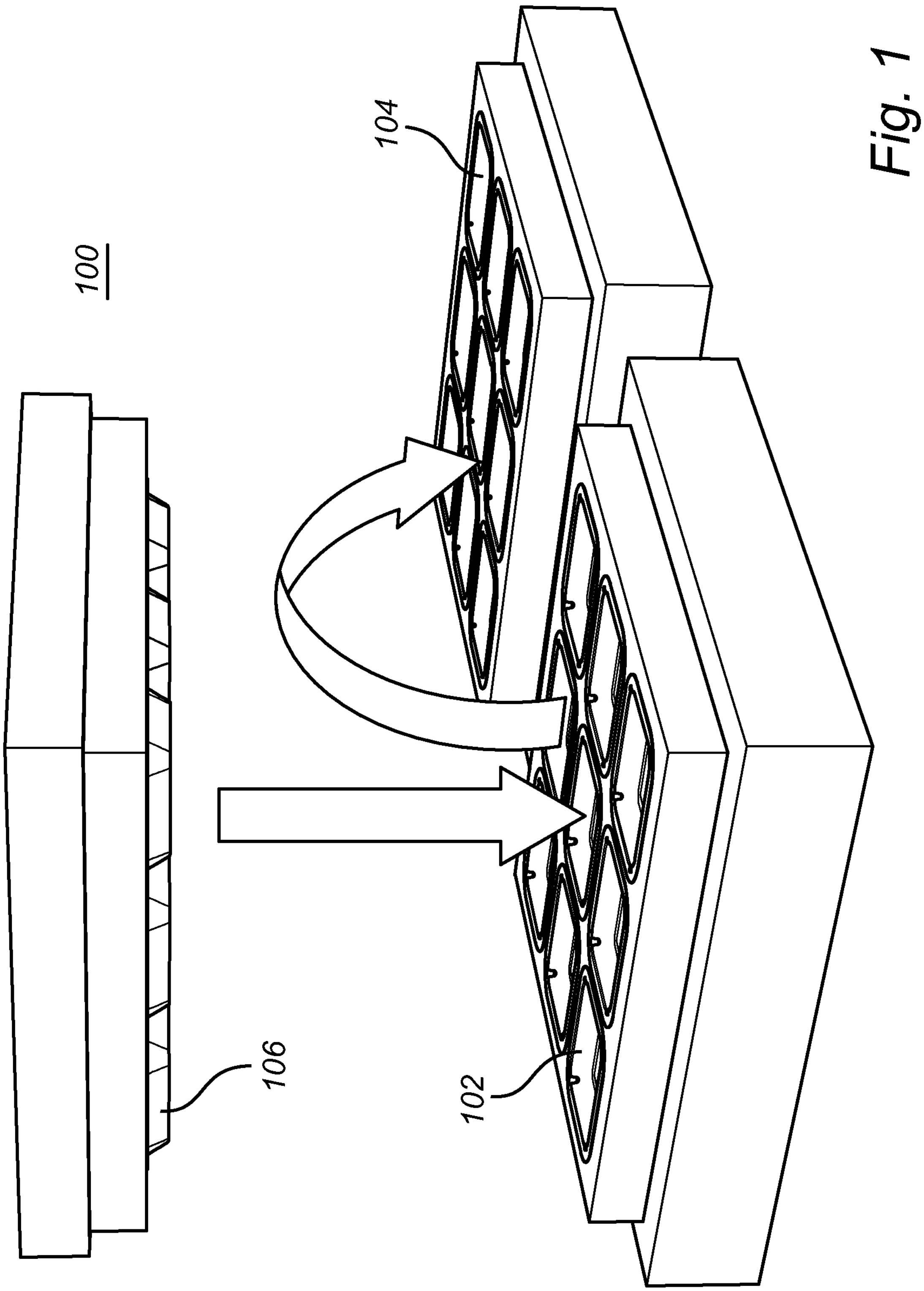
FIG. 1 schematically illustrates a manufacturing assembly comprising a compression moulding tool according to an embodiment of the invention.
Figure 2A:
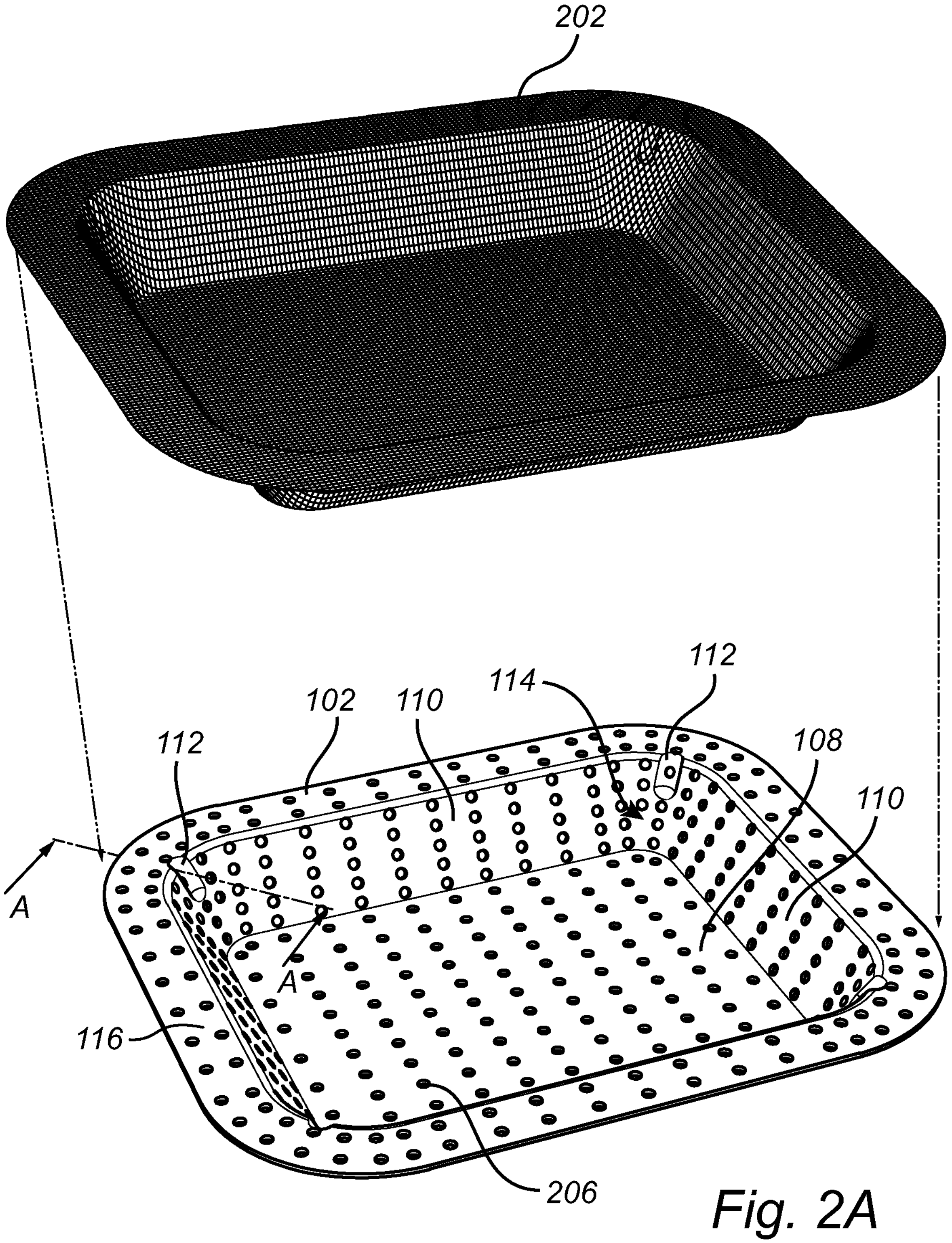
FIGS. 2A-2B schematically illustrate a first female mould element of a compression moulding tool according to an embodiment of the invention.
Figure 2B:
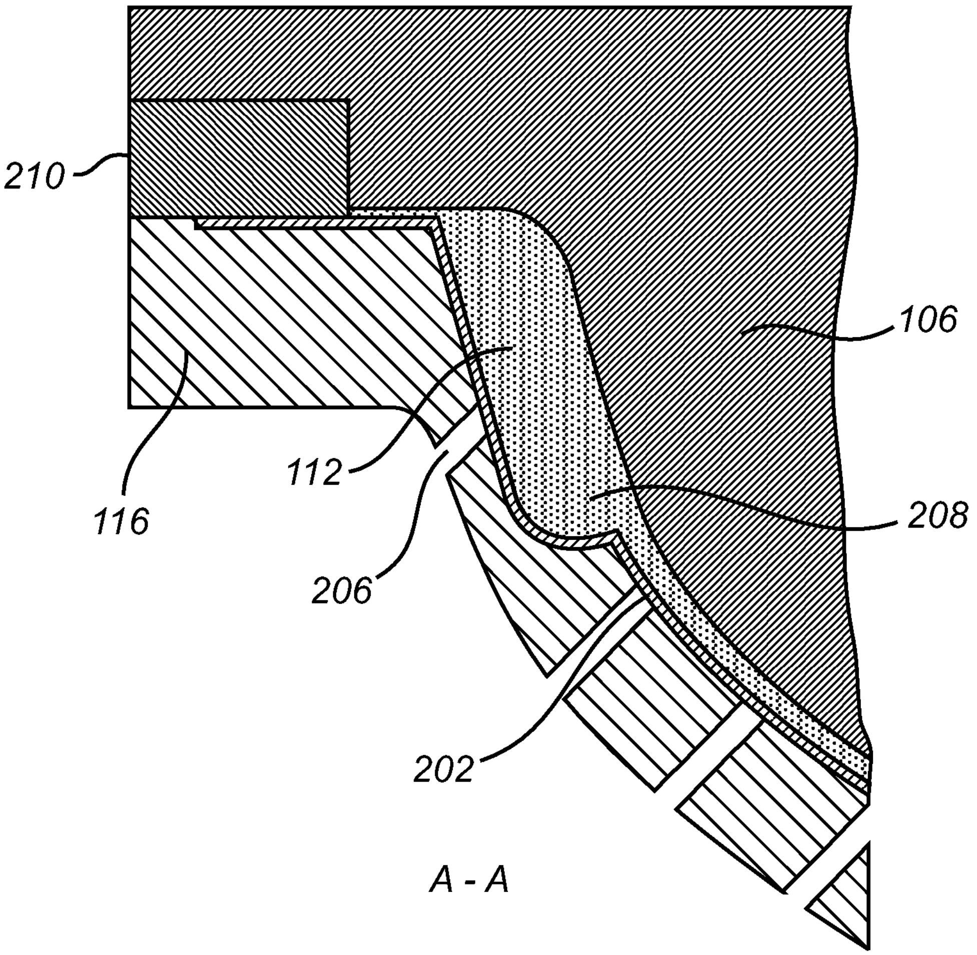
Figure 3A:
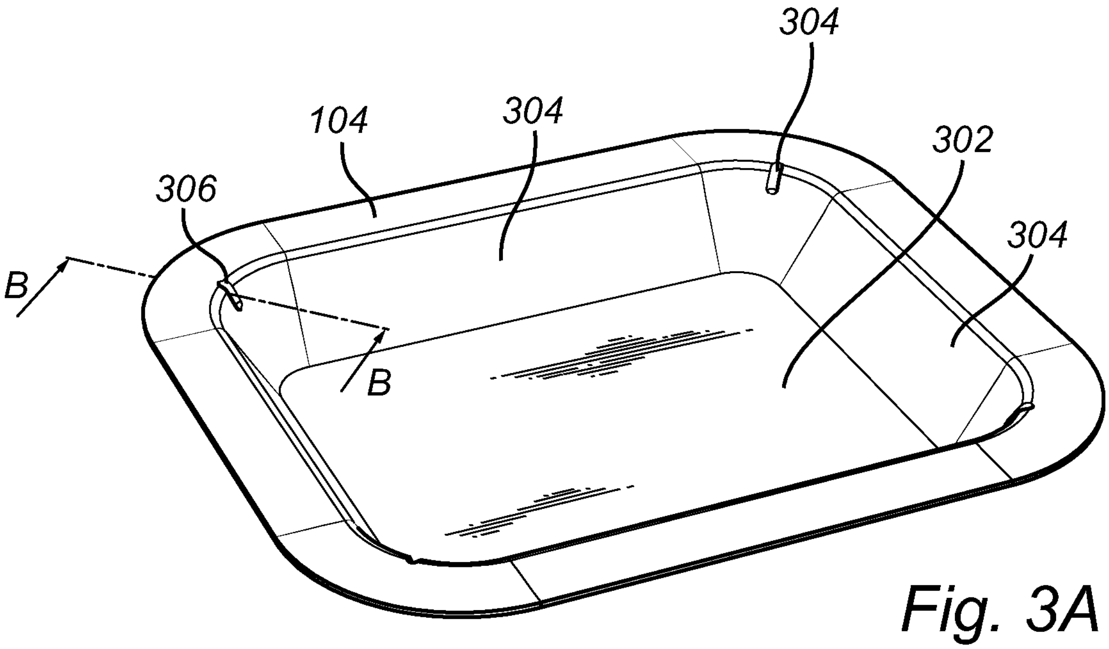
FIGS. 3A-3B schematically illustrate a second female mould element of a compression moulding tool according to an embodiment of the invention.
Figure 3B:
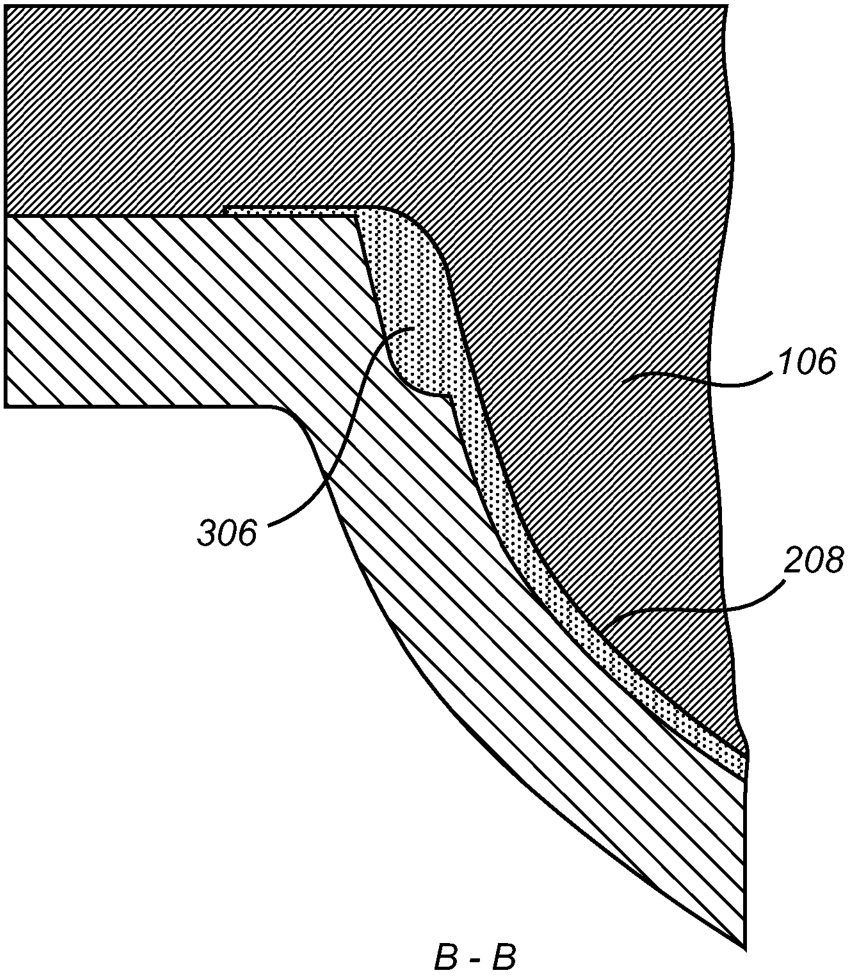
Figure 4:
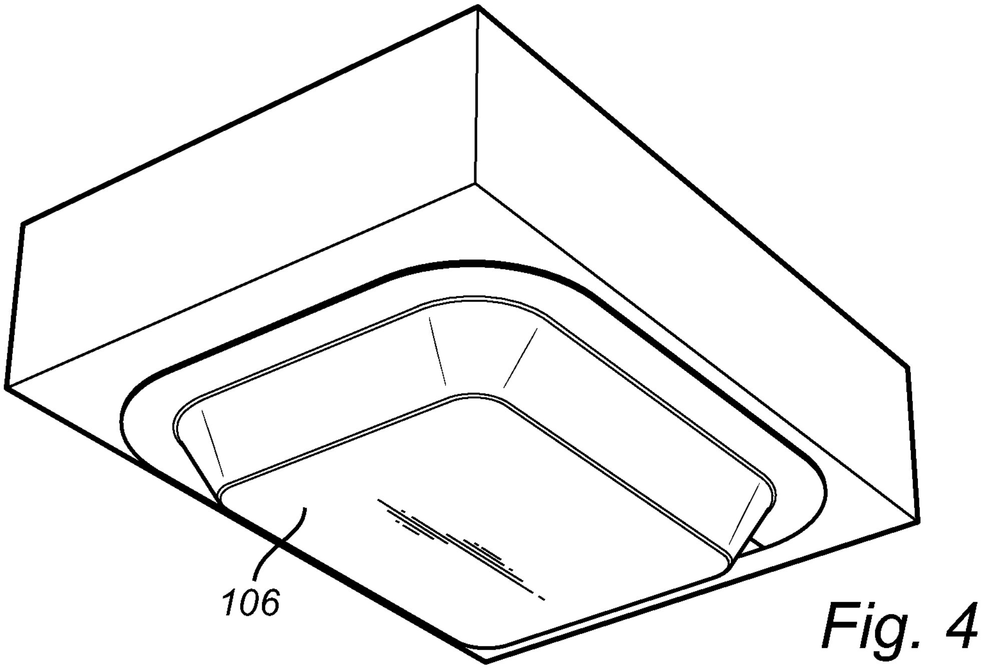
FIG. 4 schematically illustrates a male mould element of a compression moulding tool according to an embodiment of the invention.
Figure 6:
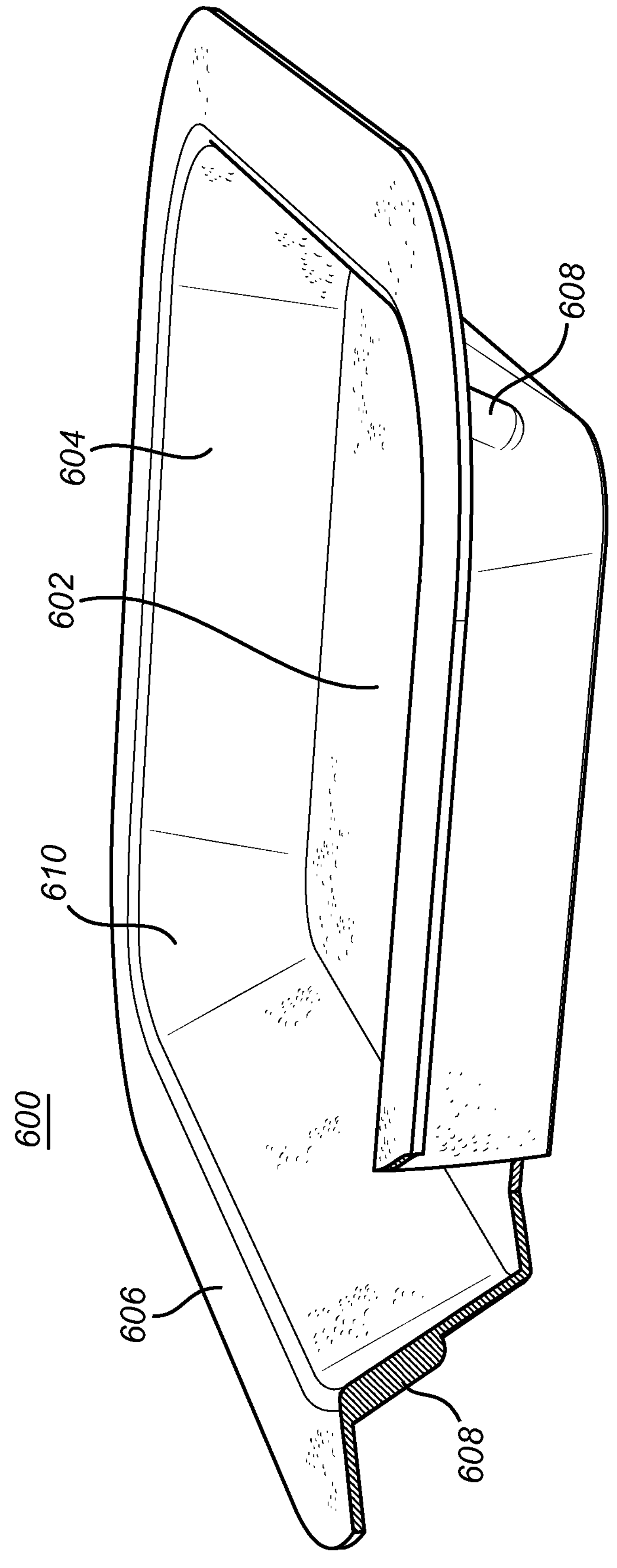
FIG. 6 is a fibrous pulp tray according to an embodiment of the invention.

FIG. 1 schematically illustrates selected parts of a manufacturing assembly 100 for manufacturing a fibrous pulp tray. In particular, FIG. 1 illustrates the tools used in two compression steps which preferable are performed consecutively. The manufacturing assembly 100 will be described with further reference to FIGS. 2-4 illustrating the different elements of the compression moulding tool, where FIGS. 2A-2B illustrate a first female mould element 102, FIGS. 3A-3B illustrate a second female mould element 104 and FIG. 4 illustrates a male mould element 106. Reference will also be made to FIG. 6 illustrating a tray 600 manufactured by the described compression moulding tool.

The illustrated compression moulding tool is configured to manufacture a fibrous pulp tray 600 illustrated in in FIG. 6 having a floor portion 602, walls 604 extending from the floor portion, and a flange 606 extending horizontally from the upper portion of the walls 604. The tray 600 can be considered to have an inner surface and an outer surface, where the upper surface of the flange 606 belong to the inner surface of the tray and the lower surface of the flange 606 belong to the outer surface of the tray 600. The described shape of the tray should be seen as an illustrative example, and the tool can be configured in many different ways to manufacture trays of different shapes, with or without a flange. Moreover, the illustrated tool comprises a 3×3 array of female and male mould elements, but any number and configuration of moulds is feasible.

The tool comprises a first female mould element 102 having a floor 108 and surrounding sidewalls 110 having an outward slope to form a substantially rectangular container with an opening having an area which is larger than an area of the floor 108. The first female mould element 102 further comprises a plurality of first recessed portions 112, each first recessed portion 112 having a first volume. The first recessed portions are here arranged at an upper portion of corners 114 formed by sidewalls 110 of the first female mould element 102. As can be seen in FIG. 2A, the corners 114 of the first female mould element 102 are rounded to form a curved transition between adjacent sidewalls 110. Moreover, the illustrated recessed portions 112 are open upwards and reaches the top portion of the sidewall. However, the recessed portions may in principle be located at any position in the first female mould element, such as at the floor portion 108.

A water permeable filter 202 is arranged in the first female mould element 102 and configured to follow the surface of the female mould element 102. The illustrated water permeable filter 202 is a wire mesh configured to retain pulp fibers while allowing water to pass through the filter 202 in a dewatering process occurring when the male mould element 106 is pressed against the first female mould element 102. Moreover, the wire mesh 202 comprises a plurality of recessed portions 204 formed to fit the plurality of first recessed portions of the first female mould element. Accordingly, the wire mesh 202 is pre-formed to have a shape corresponding to the shape of the first female mould element 102, for example by form-pressing the wire mesh 202. The first recessed portions 112 have a curved profile which has the advantage that the curved profile enhances the durability of the wire mesh 202, since sharp corners would make the wire mesh 202 more susceptible to damage.

The radius of the curvature of the first recessed portion 112 is selected based on other properties of the process, such as the characteristics of the fibrous pulp material. If the radius is too large there is a risk that the entire volume of the recessed portion is not fully filled by fibrous pulp material which would in turn result in a corresponding curvature visible on the inside of a resulting tray. Thereby, a suitable radius and depth of the first recessed portion 112 depends on a range of parameters such as properties of the fibers in the fibrous pulp suspension, mesh properties, pressing force and suction/drainage parameters. Accordingly, for a given manufacturing process, the dimensions of the first recessed portion 112 can be tailored as required to achieve the solid external protrusion 608 of the tray.

The first female mould element 102 further comprises a plurality of drainage channels 206. The drainage channels 206 are preferably arranged such that each of the plurality of first recessed portions 112 comprises at least one drainage channel 206 to improve dewatering from a fibrous pulp located in the first volume formed by the first recessed portion 112, and also to ensure that the first recessed portion 112 is filled by fibrous pulp.

FIG. 2B shows a cross section along the line A-A' illustrated in FIG. 2A, where the male mould element 106 has been moved towards the first female mould element 102 to press a fibrous pulp material 208 therebetween. In FIG. 2B, it can be seen that the first recessed portion 112 is filled with the fibrous pulp material 208 which will subsequently form a protrusion in the resulting tray. Here it can also be seen that the male mould element 106 is smooth at the location of the first recessed portion 112, meaning that the male mould element 106 does not contain any macroscopic features at the location of the recessed portion 112 which would influence the resulting inner surface of the tray 600.

FIGS. 2A-2B further illustrate that the first female mould element 102 comprises a flange 116 extending horizontally from an upper portion of the walls 110 so that resulting tray 600 has a corresponding flange 606. The first female mould element 102 also comprises a holder 210 arranged to hold the wire mesh 202 in place.

The second female mould element 104 illustrated in detail in FIG. 3A has a floor 302 and sidewalls 304 such that the shape of the second female mould element 104 corresponds to the shape of the first female mould element 102. The second female mould element 104 further comprises a plurality of second recessed portions 306 at locations corresponding to the locations of the first recessed portions 112 of the first female mould element 104. Each second recessed portion 306 has a second volume which is smaller than the first volume of the first recessed portion 112. The second recessed portions 306 are configured to form corresponding protrusions 608 at an outer surface of the fibrous pulp tray 600. In practice, the second female mould element 106 can have a substantially identical shape as the first female mould element 104, with the only difference being the size of the second recessed portions 306. In other words, the second recessed portions 306 have the same shape as the first recessed portions 112 but a smaller volume.

FIG. 3B shows a cross section along the line B-B' illustrated in FIG. 3A, where the male mould element 106 has been moved towards the second female mould element 104 to press a fibrous pulp material 208 therebetween. In FIG. 3B, it can be seen that the second recessed portion 112 is filled with the fibrous pulp material 208 to form a protrusion 608 in the resulting tray as illustrated in FIG. 6. The fibrous pulp material 208 will be compressed in the second recessed portion 112 so that the protrusion 608 takes the shape of the second recessed portion 112. Moreover, due to the compression, the protrusion 608 can have a density which is equal to or higher than a density of the remainder of the tray 600. However, the density of both the tray 600 and of the protrusion 608 can be controlled by controlling parameters such as the volume of the first and second recessed portions 112, 306 and the properties of the fibrous pulp suspension. Further parameters that can be controlled to influence the density are the distance between the mould elements in a pressing step and the pressing force used.

The compression moulding tool 100 further comprises at least one male mould element 106 illustrated in FIG. 4. The male mould element 106 is configured to press against the first and second female mould elements 102, 104 to compress a fibrous pulp product located therebetween. The male mould element 106 has a smooth surface profile at least at locations corresponding to the first and second recessed portions 112, 306 of the first and second female mould. In the illustrated example, the male mould element 106 has an entirely smooth surface profile following the shape of the first and second female mould elements 102, 104 except for the recessed portions 112, 306. However, the male mould element may be configured to have protrusions and/or recessed portions at other locations and for other purposes, such as for imprinting a trademark, logotype or the like in the tray.

In FIG. 1, only one set of male mould elements 106 is illustrated since it is possible to use the same male mould element 106 for both of the described pressing steps. However, it would equally well be possible to use two separate sets of male mould elements, which may or may not be identical. Moreover, even though the second female mould element 104 and the male mould element 106 are illustrated herein without drainage channels, they may still comprise drainage channels if so desired. For example, a male mould element used in a first pressing step may comprise drainage channels while a male mould element used in a second pressing step may be without drainage channels.

Furthermore, all mould elements 102, 104, 106 are illustrated as solid elements made in one piece. However, one or more of the mould elements 102, 104, 106 may consist of a plurality of separate pieces which can be joined together to form the mould element. It would also be possible to form the mould elements from a porous material such as from porous aluminum.

Figure 5:
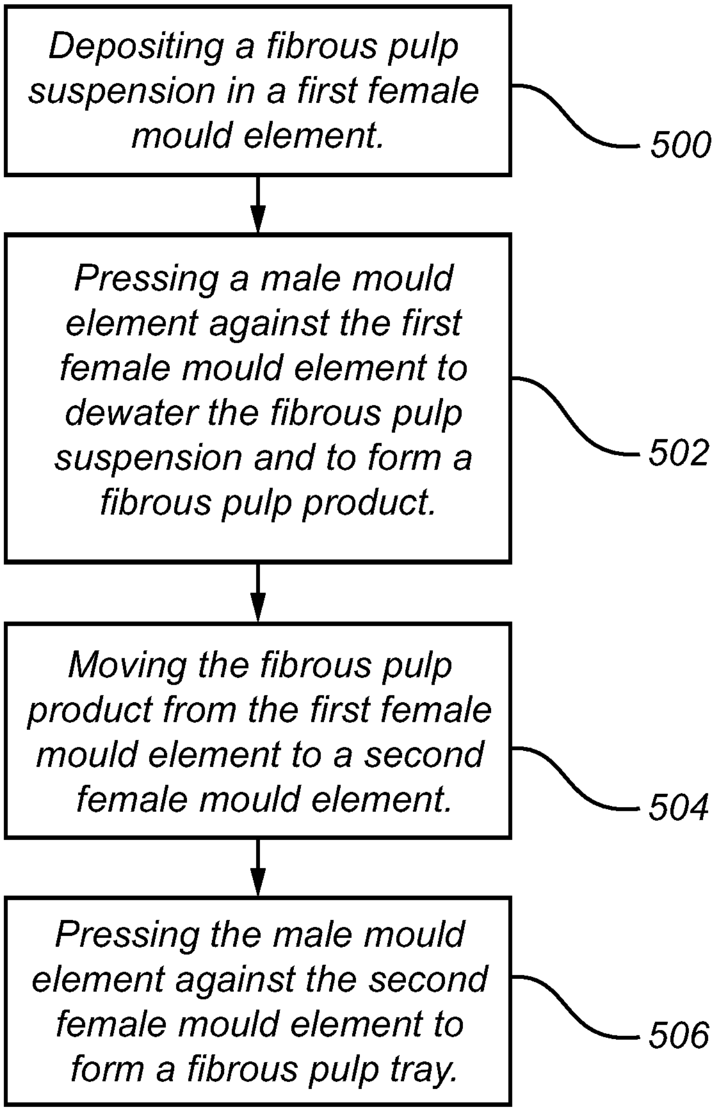
FIG. 5 is a flow chart outlining steps of a method for manufacturing a fibrous pulp tray according to an embodiment of the invention.

FIG. 5 is a flow chart outlining the general steps of a method of manufacturing a fibrous pulp tray 600 according to an embodiment of the invention. The method comprises depositing 500 a fibrous pulp suspension in the first female mould element 102, for example by dipping the first female mould element 102 in a container containing the fibrous pulp suspension.

The following step comprises pressing 502 the male mould element 106 against the first female mould element 102 to dewater the fibrous pulp suspension such that a fibrous pulp product is formed between the first female mould element 102 and the male mould element 106 and such that fibrous pulp fills the plurality of first recessions 112. The first pressing step 502 further comprises draining water from the fibrous pulp material through drainage channels 206 of the first female mould element 102.

Next, the fibrous pulp product is moved 504 from the first female mould element 102 to the second female mould element 104, for example by using vacuum to lift the fibrous pulp product from one station to the next.

Finally, the method comprises pressing 506 the male mould element 106 against the second female mould element 104 such that a fibrous pulp tray 600 is formed therebetween and such that fibrous pulp fills the plurality of second recessions 306, thereby forming a fibrous pulp product 600 having a floor 602, sidewalls 604 and protrusions 608 having a shape corresponding to the second recessed portions 306 of the second female mould element 104. The second pressing step 506 may also comprise dewatering the fibrous pulp product if required. In that case the second female mould element 104 and/or the male mould element 106 may comprise dewatering channels.

FIG. 6 illustrates a fibrous pulp tray 600 made by the above described tool and method, the tray comprising protrusions 608 on the outside of the tray 600 with no visible correspondence of the protrusions at the inside 610 of the tray 600. Thereby, stackable trays 600 are formed where the protrusions 608 define the distance between adjacent stacked trays 600. The protrusion 608 may also be referred to as a spacer configured to form a space between stacked trays. The illustrated container is a rectangular tray 600 with rounded corners and having a horizontal flange 606, but containers of many different shapes may be formed using the described method and tool, such as square, round or even polygonal containers.

The method may further comprise laminating an inside of the fibrous pulp tray 600 with a plastic film by arranging a plastic film over the tray and heating the film so that it softens and adapts to the shape of the inner surface of the tray 600. By means of the smooth inner surface of the tray, the occurrence of pinholes and other defects of the laminated film can be significantly reduced compared to for an inner surface comprising depressions, recesses protrusions or any other structure deviating from a smooth surface profile.

Even though the invention has been described with reference to specific exemplifying embodiments thereof, many different alterations, modifications and the like will become apparent for those skilled in the art. Also, it should be noted that parts of the described tool and method may be omitted, interchanged or arranged in various ways, the tool and method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A compression moulding tool for manufacturing a fibrous pulp tray having a floor portion and walls extending from the floor portion, the tool comprising:

a first female mould element having a floor and sidewalls, the first female mould element comprising a plurality of first recessed portions, each first recessed portion having a first volume;

a water permeable filter arranged in the first female mould element and configured to follow the surface of the female mould element, the water permeable filter being configured to retain pulp fibers;

a second female mould element having a floor and sidewalls corresponding to the first female mould element, the second female mould element comprising a plurality of second recessed portions at locations corresponding to the first recessed portions of the first female mould element, each second recessed portion having a second volume smaller than the first volume, wherein the second recessed portions are configured to form corresponding protrusions at an outer surface of the fibrous pulp tray; and at least one male mould element configured to press against the first and second female mould elements to compress a fibrous pulp product located therebetween, the male mould element having a surface profile at locations corresponding to the first and second recessed portions of the first and second female mould which is free from macroscopic features.

2. The compression moulding tool according to claim 1, wherein the water permeable filter is a wire mesh comprising a plurality of recessed portions formed to fit the plurality of first recessed portions of the first female mould element.

3. The compression moulding tool according to claim 1, wherein the first recessed portions have a curved profile.

4. The compression moulding tool according to claim 1, wherein the female mould element comprises a plurality of drainage channels arranged such that each of the plurality of first recessed portions comprises at least one drainage channel.

5. The compression moulding tool according to claim 1, wherein the first and second recessed portions are located at an upper portion of corners formed by sidewalls of the first and second female mould element.

6. A method for manufacturing a fibrous pulp tray comprising:

depositing a fibrous pulp suspension in a first female mould element having a floor and sidewalls, the female mould comprising a plurality of first recessed portions, each first recessed portion having a first volume, and a water permeable filter configured to retain pulp fibers arranged in in the first female mould element and configured to follow the surface of the first female mould element;

pressing a male mould element against the first female mould element to dewater the fibrous pulp suspension such that a fibrous pulp product is formed therebetween and such that fibrous pulp fills the plurality of first recessions, the male mould element having a surface profile free from macroscopic features at locations corresponding to the first recessed portions of the female mould;

moving the fibrous pulp product from the first female mould element to a second female mould element, the second female mould element having a floor and sidewalls corresponding to the first female mould element, the second female mould comprising a plurality of second recessed portions at locations corresponding to the first recessed portions of the first female mould element, each second recessed portion having a second volume smaller than the first volume;

pressing the male mould element against the second female mould element such that a fibrous pulp product is formed therebetween and such that the fibrous pulp product fills the plurality of second recessions, thereby forming a fibrous pulp product having a floor, sidewalls and protrusions corresponding to the second recessed portions of the second female mould element.

7. The method according to claim 6, further comprising:

draining water from the fibrous pulp material through drainage channels of the first female mould element.

8. The method according to claim 6, wherein depositing the fibrous pulp suspension comprises dipping the first female mould element in a container comprising a fibrous pulp suspension.

9. The method according to claim 6, further comprising laminating an inside of the fibrous pulp product with a plastic film.

* * * * *